US012221824B1

(12) United States Patent
Lawrence

(10) Patent No.: US 12,221,824 B1
(45) Date of Patent: Feb. 11, 2025

(54) REMOVEABLE WINDOW CONTROL DEVICE

(71) Applicant: Barry G. Lawrence, Trinity, NC (US)

(72) Inventor: Barry G. Lawrence, Trinity, NC (US)

( * ) Notice: Subject to any disclaimer, the term of this patent is extended or adjusted under 35 U.S.C. 154(b) by 0 days.

(21) Appl. No.: 18/315,980

(22) Filed: May 11, 2023

(51) Int. Cl.
*E05F 5/00* (2017.01)
*E05C 17/02* (2006.01)
*E05C 17/48* (2006.01)
*E05C 17/60* (2006.01)

(52) U.S. Cl.
CPC .............. *E05F 5/003* (2013.01); *E05C 17/02* (2013.01); *E05C 17/48* (2013.01); *E05C 17/60* (2013.01); *E05Y 2201/224* (2013.01); *E05Y 2900/148* (2013.01); *Y10S 292/47* (2013.01)

(58) Field of Classification Search
CPC .. E05B 65/0852; E05B 65/0864; E05C 17/60; E05C 17/02; E05C 2007/007; E05C 1/10; Y10S 292/20; Y10S 292/47; Y10S 292/46; Y10S 292/15; Y10T 292/0886; Y10T 292/097; Y10T 292/65; E05F 5/003
See application file for complete search history.

(56) References Cited

U.S. PATENT DOCUMENTS 4,824,154 A * 4/1989 Simpson ................... E05C 5/00 292/338
4,917,416 A * 4/1990 Westphal .................. E05C 1/04 292/DIG. 47
4,923,230 A * 5/1990 Simpson ............. E05B 65/0852 292/DIG. 47
5,248,174 A * 9/1993 Matz ................... E05B 65/0852 292/DIG. 47
5,536,052 A * 7/1996 Maier ................. E05B 65/0852 292/DIG. 47
5,553,903 A * 9/1996 Prete ................... E05B 65/0882 292/138
5,575,116 A 11/1996 Carlson et al.
5,806,900 A * 9/1998 Bratcher ............. E05B 65/0864 292/DIG. 47
6,484,444 B1 * 11/2002 Polowinczak ...... E05B 65/0864 49/449
6,854,214 B2 * 2/2005 Polowinczak ...... E05B 65/0864 49/449
7,431,356 B2 * 10/2008 Liang ...................... E05D 13/04 292/228
7,588,271 B1 9/2009 Lawrence
8,235,430 B2 8/2012 Liang et al.
8,360,484 B2 1/2013 Liang et al.
(Continued)

*Primary Examiner* — Justin B Rephann
(74) *Attorney, Agent, or Firm* — Tuggle Duggins P.A.; Blake P. Hurt; Reinier R. Smit

(57) ABSTRACT

A removeable window control device in the nature of a vent stop including a housing having a peripheral flange defining an opening, at least one channel, and a pair of opposingly oriented sockets, a bolt including at least one leg, wherein the leg further includes a protuberance and a tab, a cover including a lateral side of substantially similar shape and size of a lateral side of the housing, wherein the cover further includes a pair of opposingly oriented pegs and at least one channel, and a resilient member engaging a conduit defined in the bolt and a back side of the housing to urge the bolt along the channels formed in the housing and cover towards the opening defined by the peripheral flange of the housing. The vent stop is preferably inserted into a frame of a window.

9 Claims, 10 Drawing Sheets

(56) References Cited

U.S. PATENT DOCUMENTS

| | | | | |
|---|---|---|---|---|
| 8,776,441 | B1 | 7/2014 | Lawrence | |
| 8,776,442 | B1 | 7/2014 | Lawrence | |
| 8,806,809 | B1 | 8/2014 | Lawrence | |
| 8,950,119 | B2 * | 2/2015 | Piltingsrud | E05C 17/60<br>292/DIG. 20 |
| 9,435,149 | B1 * | 9/2016 | Glickman | E05C 17/60 |
| 10,119,311 | B2 * | 11/2018 | Piltingsrud | E05C 17/46 |
| 10,815,707 | B2 * | 10/2020 | Piltingsrud | E05C 17/60 |
| 11,156,024 | B1 | 10/2021 | Lawrence | |
| 11,180,942 | B1 | 11/2021 | Lawrence | |
| 2005/0011131 | A1 * | 1/2005 | Liang | E05D 13/04<br>49/449 |
| 2005/0146143 | A1 * | 7/2005 | Lutfallah | E05C 17/60<br>292/153 |
| 2012/0144752 | A1 * | 6/2012 | Piltingsrud | E06B 7/00<br>49/506 |

* cited by examiner

REMOVEABLE WINDOW CONTROL DEVICE

FIELD OF THE INVENTION

The disclosure herein pertains to window hardware in general, and in particular to a simplified removable window vent stop with a bolt having at least one protuberance that is guided along a channel formed in the housing and a channel formed in a cover, so as to fully encase the lateral sides of the vent stop.

DESCRIPTION OF THE PRIOR ART AND OBJECTIVES OF THE INVENTION

The most common types of windows used and known in the art are known as hung windows or sliding windows. These types of windows have at least one sash that slides relative to another sash as the window is opened or closed. Vent stops are generally used in combination with each sash to allow a double sash window to provide ventilation while restricting the window from fully opening for safety concerns. Vent stops typically include a housing and a bolt contained therein which can be moved from an open configuration to a closed configuration, depending on the user's preference.

Prior vent stops often include a bolt that contains an axle positioned through an aperture formed in either the housing or a cover of the housing. In these prior embodiments, a portion of the bolt, namely the axle, protrudes out of a lateral side of the housing or cover component. Furthermore, prior vent stops that include a bolt comprising an axle positioned through an aperture formed in either the housing or a cover of the housing creates a lot of mechanical strain on the axle, leading to uneven wear causing the vent stop to malfunction after an extended period of use.

Several prior art window stop devices have been proposed, including U.S. Pat. Nos. 5,575,116; 8,235,430; 8,360,484; 8,806,809; and 11,180,942. The disclosures of these references are incorporated herein in their entirety by reference. While these prior art devices function well enough, they are complicated to manufacture and involve intricate detent mechanisms to maintain the stop blocks in the closed position which makes them undesirable and expensive.

Thus, in view of the problems and disadvantages associated with prior vent stops devices, the present disclosure was conceived and one of its objectives is to provide a partially enclosed housing, wherein the bolt positioned within the housing only protrudes from an opening formed in a top surface of the housing.

It is another objective of the present disclosure to provide a vent stop including a cover and housing that fully enclose the lateral sides of the vent stop.

It is still another objective of the present disclosure to provide a vent stop that is easily inserted and removed from an opening formed in a sash.

It is yet another objective of the present disclosure to provide a vent stop that is easily manufactured with minimal components, reducing the labor required to assemble the vent stop.

It is a further objective of the present disclosure to provide a vent stop that includes a bolt positioned within a housing and a cover, wherein the bolt is urged in a direction substantially aligned with the opening formed in the housing.

Various other objectives and advantages of the present disclosure will become apparent to those skilled in the art as a more detailed description is set forth below.

SUMMARY OF THE INVENTION

The aforesaid and other objectives are realized by providing a vent stop for reliable and secure opening of a double hung window. In the preferred method of use, at least two vent stops are installed on a single window sash, with one vent stop on either side of the sash frame. The vent stop includes a housing, a cover, bolt, and a resilient member engaged with and biasing the bolt in a lateral direction. The resilient member includes a proximal end positioned within a conduit formed on a back side of the bolt and a distal end positioned within a slot formed by two walls within the housing. The resilient member attached to the bolt urges the moveable body from a closed positioned (i.e., the bolt is substantially contained within the housing and cover) to an open position (i.e., a portion of the bolt protrudes from an opening formed on the top surface of the housing). In the preferred embodiment, the resilient member urges the bolt in a lateral direction out of an opening defined in the housing. The bolt includes at least one leg depending from a back side of the bolt, the leg including a protuberance on a lateral side and a tab on a longitudinal side that extends away from the bolt. In the preferred embodiment, the bolt defines two lateral sides, and two legs depending from the back side of the bolt, with each leg defining one protuberance on either lateral side. The housing and the cover include lateral sides comprising an indentation forming a channel configured (i.e., sized, shaped, and otherwise capable) to receive the protuberance of the bolt. In the preferred embodiment, the channels are configured to guide the bolt as the resilient member urges the bolt in a lateral direction out of an opening defined in the housing.

DETAILED DESCRIPTION OF THE PREFERRED EMBODIMENT AND OPERATION OF THE INVENTION

Figure 1:
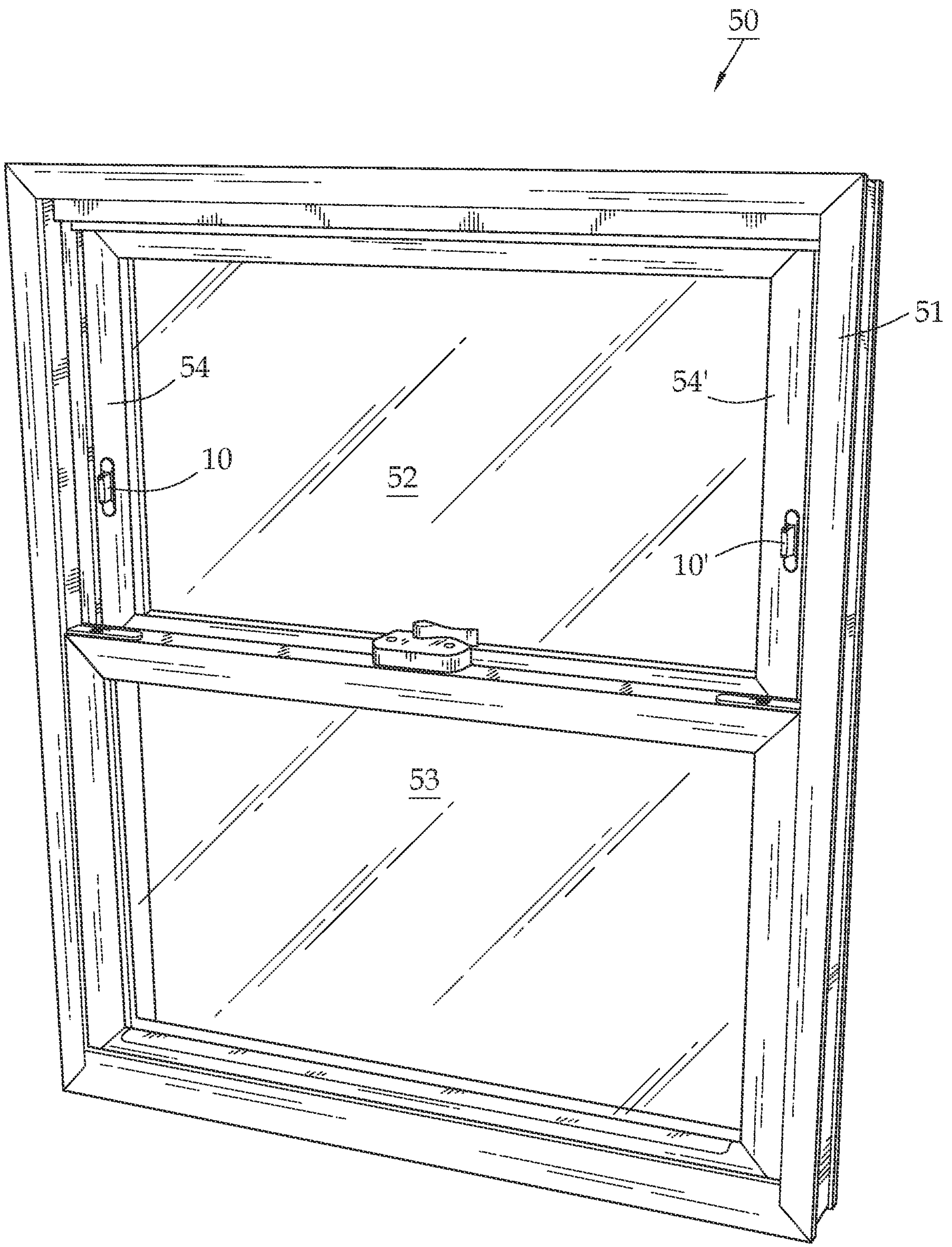
FIG. 1 shows a perspective view of a double hung window with a pair of vent stops installed in the frame.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

For a better understanding of the disclosure and its operation, turning now to the drawings FIGS. 1-10 show the disclosure in various views, a typical double hung window 50 is shown in FIG. 1 having a frame 51, an upper sash 52 and a lower sash 53. In the view shown, the lower sash 53 is located on the bottom, below the upper sash 52. A pair of vent stops 10, 10' are inserted into openings (not shown) formed in respective stiles 54, 54', or the vertical supports of the sash frame 51. When the vent stops 10, 10' are in a closed configuration, the window sashes 52, 53 are free to slide relative to one another as the window is opened or closed. When the vent stops 10, 10' are in an open configuration, the window sashes 10, 10' may be restricted from a full range of motion and fully opening. This orientation and positioning is considered exemplary (and not intended as a limitation) as vent stops 10, 10' may also be positioned at other locations about window 50 as desired, including (but not limited to) the jambs included within window 50 or positioned horizontally across the top rail of lower sash 33.

Figure 2:
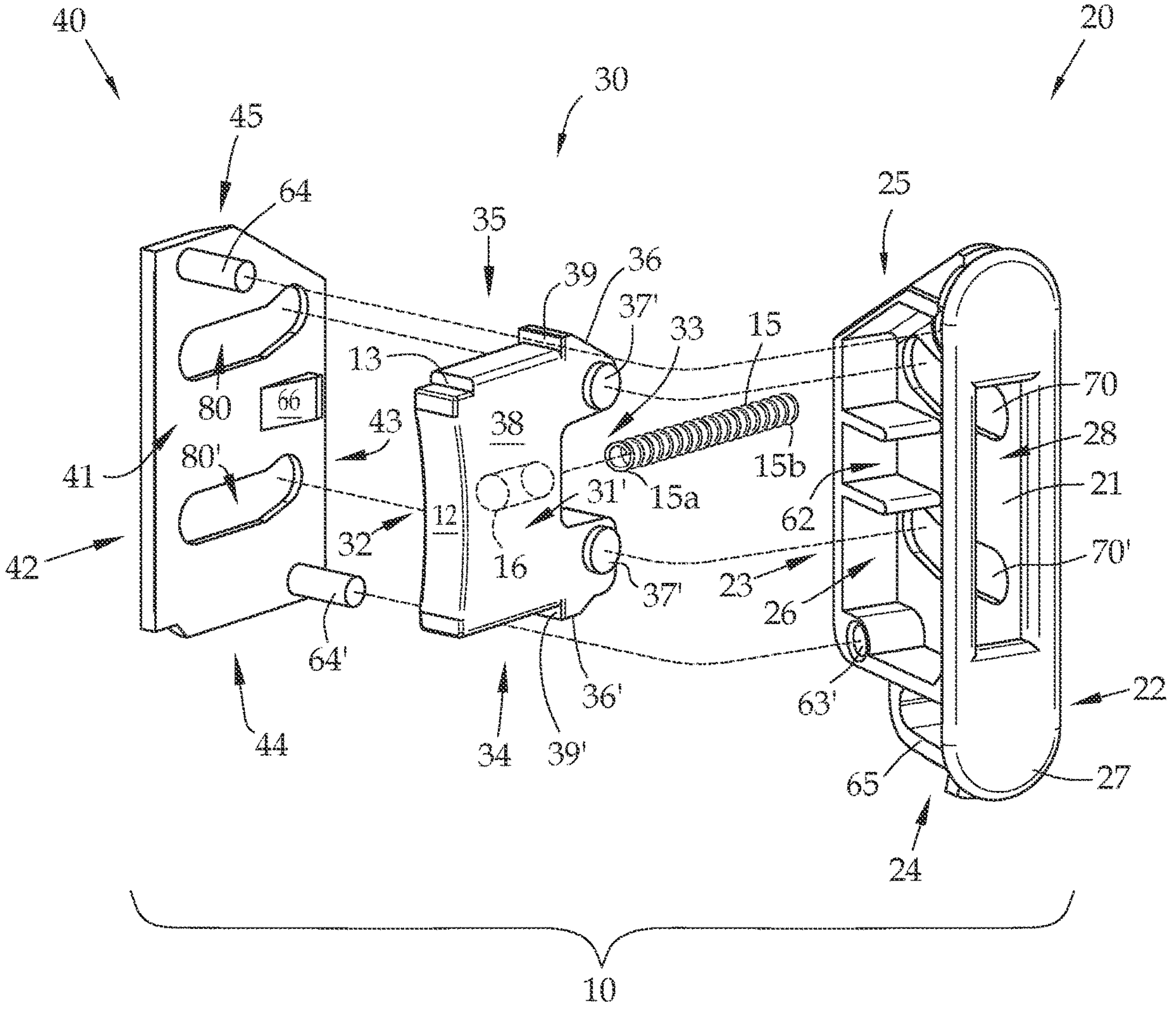
FIG. 2 pictures an exploded perspective view of a vent stop of the present disclosure.
Figure 3:
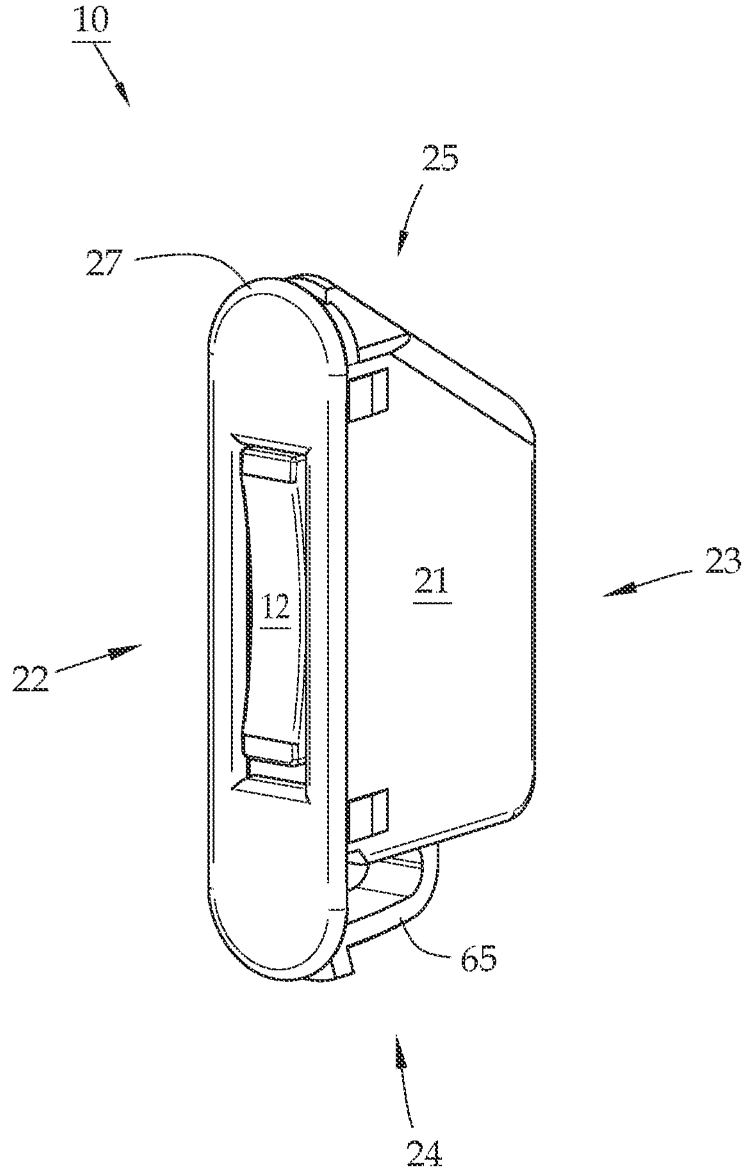
FIG. 3 depicts a right side perspective view of the vent stop as shown in FIG. 2 in a closed configuration.
Figure 4:
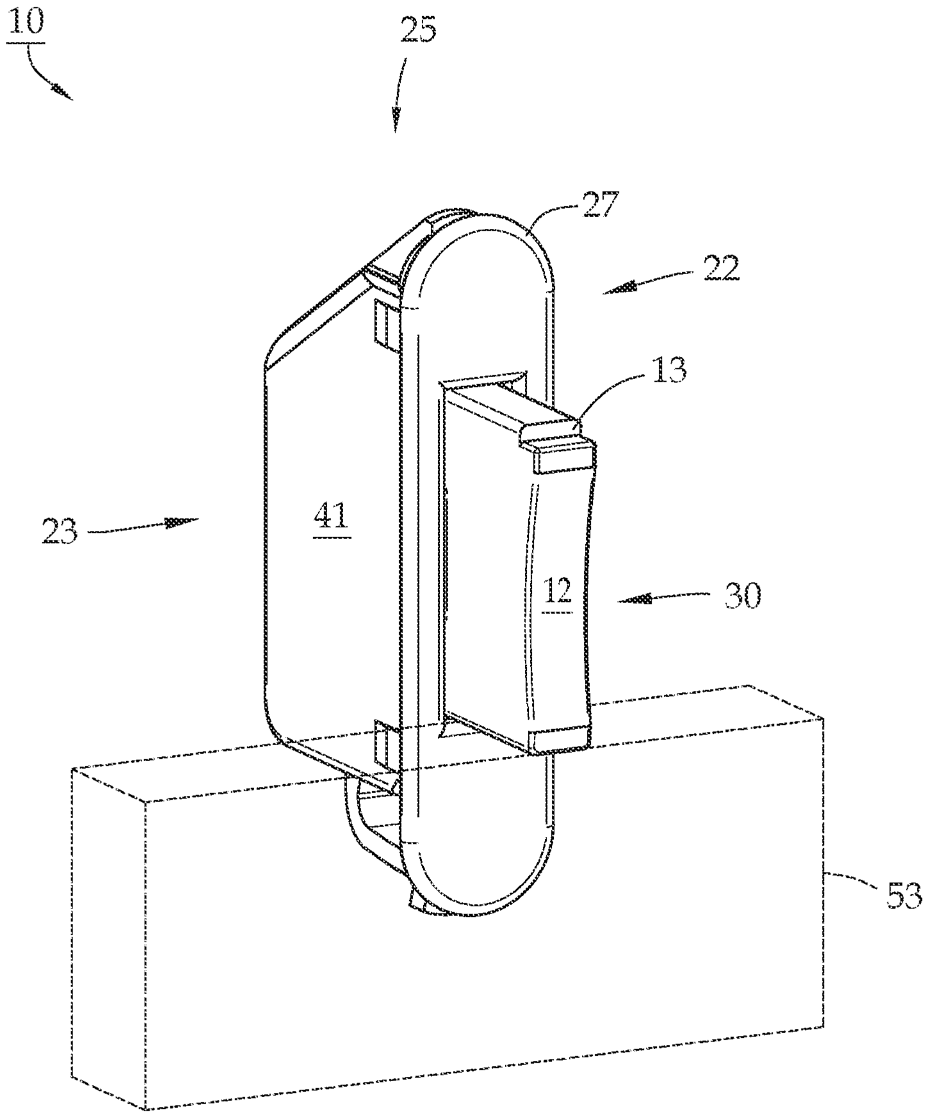
FIG. 4 demonstrates a left side perspective view of the vent stop as shown in FIG. 2 in an open configuration with the bolt engaging a window sash which is shown in dashed lines.
Figure 5:
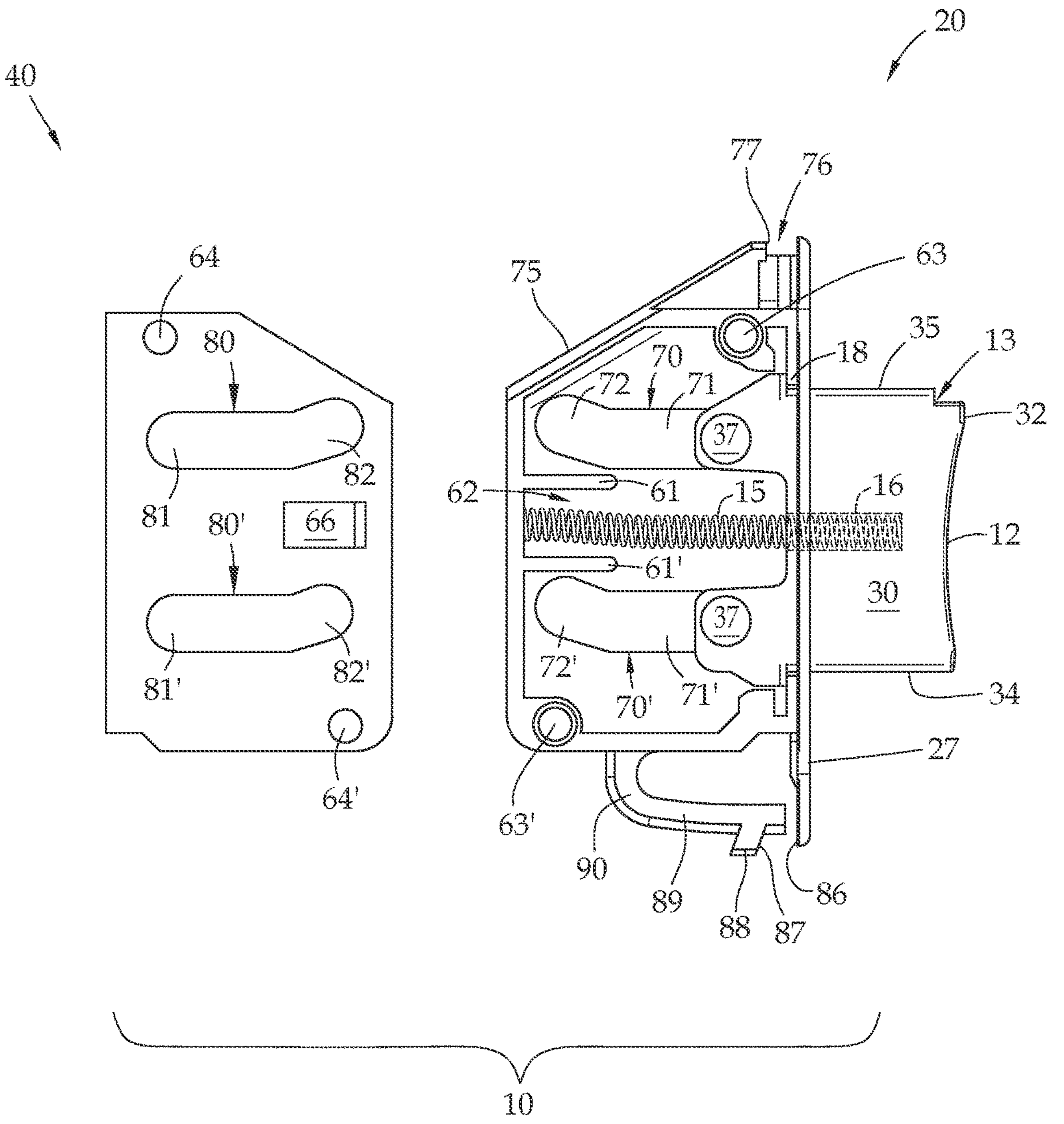
FIG. 5 illustrates a side elevational view of the vent stop as shown in FIG. 2 with the bolt shown in an open configuration with the cover removed and flipped over.
Figure 6:
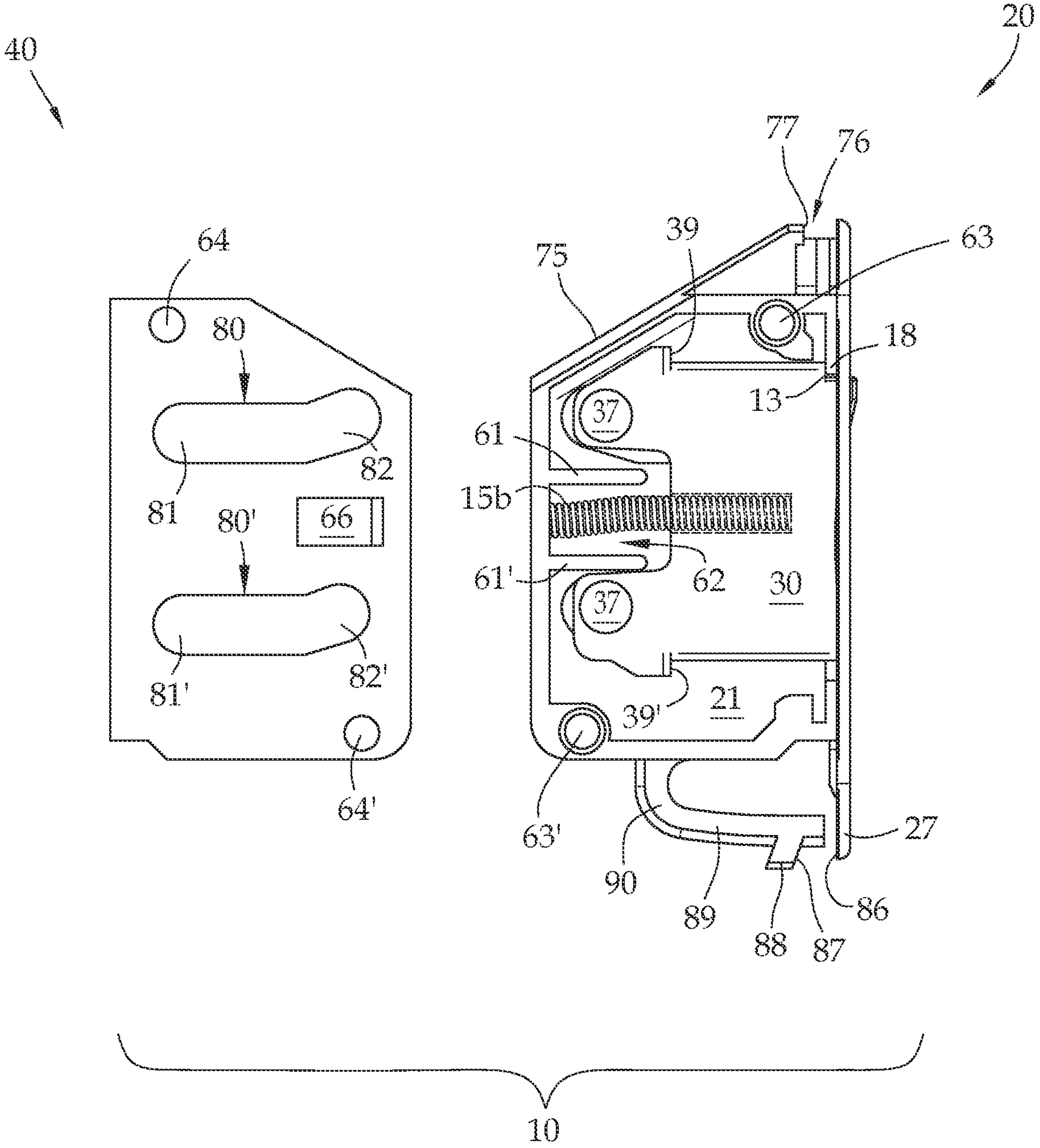
FIG. 6 features a side elevational view of the vent stop as shown in FIG. 2 with the bolt shown in a closed configuration with the cover removed and flipped over.
Figure 7:
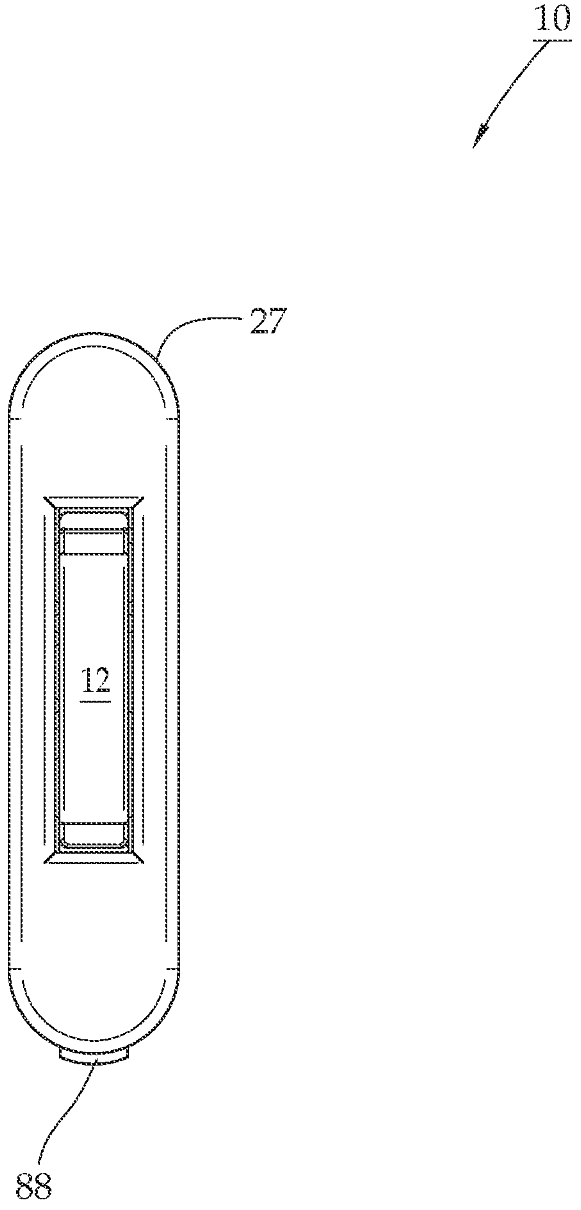
FIG. 7 shows a top view of the vent stop as shown in FIG. 2 in an open configuration.
Figure 8:
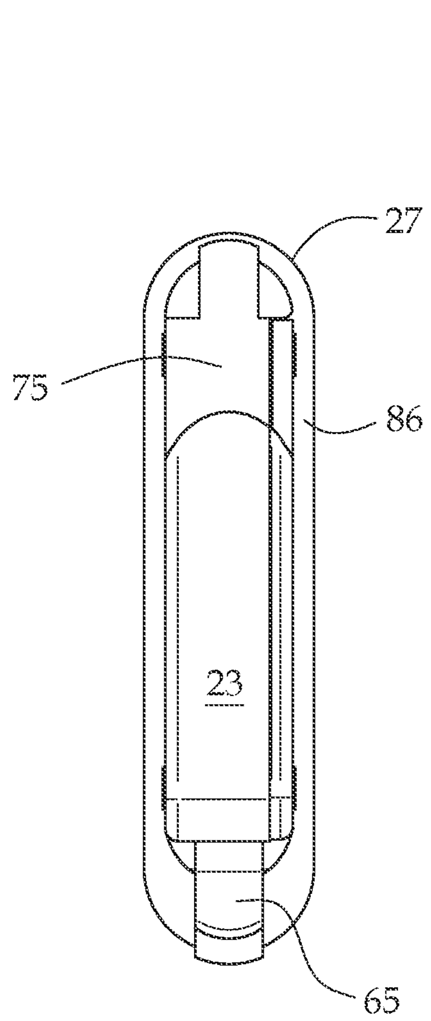
FIG. 8 illustrates a bottom view of the vent stop as shown in FIG. 2 in an open configuration.
Figure 9:
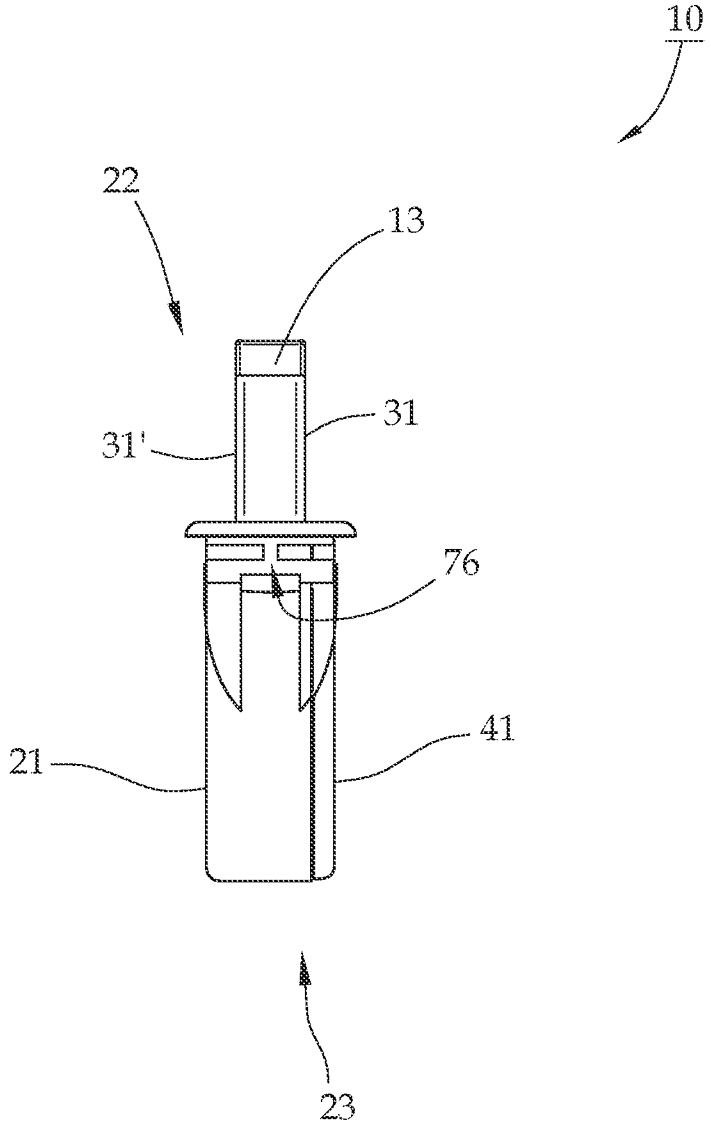
FIG. 9 depicts a front elevational view of the vent stop as shown in FIG. 2 in an open configuration.
Figure 10:
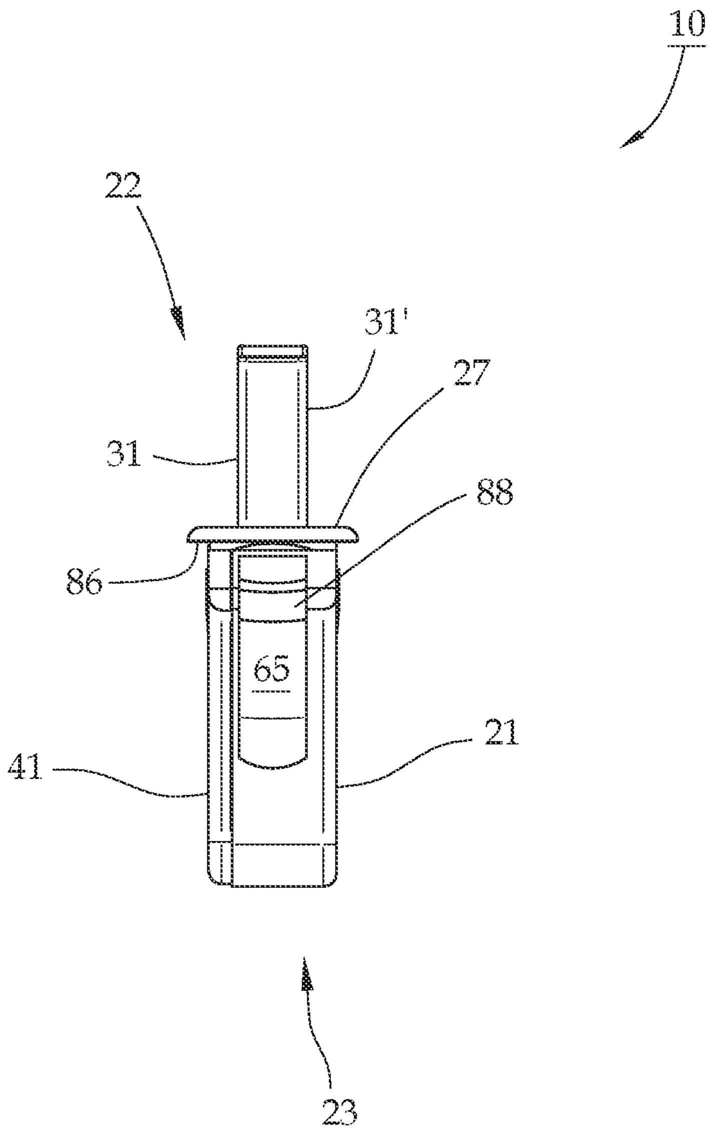
FIG. 10 demonstrates a back elevational view of the vent stop as shown in FIG. 2 in an open configuration.

In the preferred embodiment, as shown in the exploded perspective view in FIG. 2, the vent stop 10 includes a housing 20, a cover 40, a bolt 30, and a resilient member 15. The housing 20 comprises a lateral side 21, a front side 22, a back side 23, a bottom side 24, and a top side 25, forming a cavity 26. The front side 22 of the housing 20 includes a peripheral flange 27 defining an opening 28 and a body depending from the peripheral flange 27. The housing 20 includes at least one indentation or channel 70 formed in the lateral side 21 facing the cavity 26 to receive a protuberance 37 of the bolt 30 so as to guide the bolt 30 along the channel 70 when moving between an open configuration as seen in FIGS. 4, 5 and a closed configuration as seen in FIGS. 3, 6. In the preferred embodiment, the lateral side 21 of the housing 20 includes two indentations or channels 70, 70' that are substantially aligned to the opening 28 defined by the peripheral flange 27 on the front side 22 of the housing 20. The housing 20 also includes a pair of walls 61, 61' on the lateral side 21 facing the cavity 26 that collectively form a slot 62 for retaining a distal end **15*b* of the resilient member 15 when the vent stop 10 is fully assembled. In the preferred embodiment, the pair of walls 61, 61' are integrally formed with the lateral side 21 of the housing 20 and a back side 23 of the housing 20. The housing 20 further includes diagonally opposed sockets 63, 63'** for a purpose to be described in greater detail hereafter.

In the preferred embodiment, as shown in the FIGS. 3, 4, 5, and 6, the top side 25 of the housing 20 has an angular orientation and extends inwardly toward the back side 23 of the housing 20, forming an obtuse angle with the back side 23 of the housing 20 and defines a ramp surface 75. The end of ramp surface 75 closest to the peripheral flange 27 may define a recess 76. The distance between an upper surface 77 of recess 76 and an underside 86 of the flange 27 is determined based on the thickness of the material used to build the window sash and/or window frame, most often vinyl or fiberglass in current windows. The bottom side 24 of the housing 20 defines a straight sidewall forming a substantially perpendicular angle with the back side 23 of the housing 20. The bottom side 24 of the housing 20 may also include one or more spring legs 65 depending therefrom configured to engage a window wall surface under compression, so as to facilitate an easier entry and removal relative to the prior art. The spring leg 65 originates proximate the back side 23 of the housing 20 and extends outwardly and then upwardly from the bottom side 24 of the housing 20, terminating just below an underside surface 86 of the flange 27. In the preferred embodiment, the spring leg 65 defines a curved section 90 and a straight section 89, with the curved section 90 attached to the bottom side 24 of the housing 20. The curved section 90 of the spring leg 65 functions as a pivot point, whereby the straight section 89 can flex towards and away from the housing 20. The straight section 89 of the spring leg 65 includes a protrusion 88 located near a distal end (i.e., the end not integrally formed with the housing 20) of the spring leg 65. The distance between an upper surface 87 of protrusion 88 and the underside 86 of the flange 27 may be selected based on the typical thickness of the material used to build the window sash and/or window frame, most often vinyl or fiberglass in current windows. In the preferred embodiment, the distance between the upper surface 87 of the protrusion 88 and the underside 86 of the flange 27 is substantially equal to the distance between an upper surface 77 of recess 76 and an underside 86 of the flange 27.

The preferred cover 40 of the vent stop 10 as seen in FIGS. 5 and 6 includes a lateral side 41 that includes diagonally opposing pegs 64, 64' on the inside thereof for engagement with sockets 63, 63', respectively. The overall shape of the cover 40 is substantially similar to the lateral side 21 of the housing 20 so that when the cover 40 is mated with the housing 20, the lateral sides 41, 21 respectively of the vent stop 10 are fully enclosed. The cover 40 also includes a wedge 66 proximate a back side 43 of the cover 40. The wedge 66 is configured (i.e., sized, shaped and otherwise capable) to seat within the slot 62 formed by the pair of walls 61, 61' when the cover 40 is mated with the housing 20. When mated together, the pegs 64, 64' of the cover 40 form an interference fit (e.g., press fit) with the sockets 63, 63' of the housing 20. The cover 40 further includes at least one indentation forming a channel 80 on the lateral side 41 of the cover 40 that corresponds to the at least one channel 70 formed on the lateral side 21 of the housing 20 when the cover 40 and housing 20 are mated together. In the preferred embodiment, as shown in the figures, the cover 40 includes two indentations forming two channels 80, 80' on the lateral side 41 of the cover 40. When the preferred cover 40 is mated together with the housing 20, the channels 80, 80' of the cover 40 align with the channels 70, 70' of the housing 20.

The channels 70, 70', 80, 80' are preferably indentations on the lateral sides 21, 41 of the housing 20 and cover 40, respectively. In the preferred embodiment, the channels 70, 70', 80, 80' are substantially formed along an axis that is aligned to the opening 28 defined by the peripheral flange 27 on the front side 22 of the housing 20. The preferred channels 70, 70', 80, 80' are somewhat arcuate in shape having an upper portion 71, 71', 81, 81' respectively that defines a straight channel and a lower portion 72, 72', 82, 82' respectively that defines a slight bend. The somewhat arcuate shaped channels 70, 70', 80, 80' allow for mostly lateral movement with a limited longitudinal movement as the bolt 30 is pressed into the cavity 26 formed by the housing 20 and cover 40.

The bolt 30, as shown in FIGS. 2, 5, 6, 9, and 10, has a generally rectangular-shaped body 38 that includes two lateral sides 31, 31', a front side 32, a back side 33, and two longitudinal sides forming top side 35 and bottom side 34. The bolt 30 may include at least one leg 36 depending from the back side 33 of the body 38. The leg 36 extends below the generally rectangular-shaped body 38 and includes a protuberance 37 and a tab projection 39. The bolt 30 also defines a conduit 16 on the back side 33 of the rectangularly shaped body 38 for receipt of a proximal end 15*a* of the resilient member 15. In the preferred embodiment, the leg 36 includes respectively two protuberances 37, 37' on each lateral side 31, 31' of the bolt 30. The protuberances 37, 37' are preferably a circularly shaped extrusion that is configured (i.e., sized, shaped, and otherwise capable) to fit into the channels 70, 70', 80, 80' formed in the housing 20, and cover 40 respectively. In the preferred embodiment, the tab projection 39 of the leg 36 is a projection that extends outwardly from the top longitudinal side 35 of the bolt 30. In the preferred embodiment, as best seen in FIG. 2, the bolt 30 includes two legs 36, 36' depending from the back side 33 of the bolt 30. In the preferred embodiment, each leg 36, 36' includes a tab projection 39, 39' respectively extending outwardly from the top longitudinal side 35 and the bottom longitudinal side 34 to prevent the bolt 30 from passing through the opening 28 of the housing 40. The tab projections 39, 39' are configured (i.e., sized, shaped, and otherwise capable) to inhibit the bolt 30 from displacing out of the cavity 26 through the opening 28 as seen in FIG. 5. The front side 32 of the bolt 30 also includes a top surface 12 configured to be pressed by a user. In the preferred embodiment, the top surface 12 of the bolt 30 defines a concave surface as seen in FIG. 5 and may further include a notch 13 at the edge between the front side 32 and top longitudinal side 35. When the bolt 30 is fully depressed into the cavity 26, the lower portions 72, 72', 82, 82' of the channels 70, 70', 80, 80' urge the bolt 30 to move slightly longitudinally towards the top side 25 of the housing 20 of the vent stop 10. When the bolt 30 is urged slightly towards the top side 25 of the housing 20 of the vent stop 10, the notch 13 formed near the front side 32 and top longitudinal side 35 of the bolt 30 may catch a lip 18 of the peripheral flange 27 to lock bolt 30 into a closed configuration as seen in FIG. 6.

In the preferred embodiment, as shown in the figures, the bolt 30 may be configured to rock slightly towards the lip 18 of the peripheral flange 27 when the bolt 30 is pressed into the cavity 26 formed by the housing 20 and cover 40. This is particularly advantageous because it allows a user to maintain the bolt 30 in a closed configuration, as shown in FIG. 6, without any need for additional latching components. When a user wishes to leave the vent stop 10 in a closed configuration, the user simply pressed the bolt 30 into the cavity 26 and then the lower portions 72, 72', 82, 82' of the channels 70, 70', 80, 80' urge the bolt 30 to move slightly longitudinally, towards the top side 25 of the housing 20, so that the notch 13 may be caught and retained against the lip 18 of the peripheral flange. The resilient member will urge the bolt laterally, along an axis that is aligned to the opening 28 defined by the peripheral flange 27 on the front side 22 of the housing 20. To toggle the vent stop 10 from the closed configuration to the open configuration, the user presses the bolt 30 further into the cavity 26 until the notch 13 and lip 18 are no longer engaged, the bolt 30 is rocked away from the lip 18 of the peripheral flange 27 so that the notch 13 is not caught and retained by the lip 18, the bolt 30 freely extends out of the opening 28, and the tab projections 39, 39' inhibit the bolt 30 from displacing out of the cavity 26 through the opening 28, as seen in FIG. 5.

The method of assembling the vent stop 10 of the present disclosure requires less components, is quick and easy to accomplish, and remains mated together without any fasteners. During assembly, before the cover 40 is mated with the housing 20, the bolt 30 is inserted into the housing 20. During insertion, a pair of protuberances 37' align and fit into the channels 70, 70' formed by indentations on the lateral side 21 of the housing 20. The bolt 30 is orientated such that the notch 13 formed proximate top longitudinal side 35 and front side 32 is near the top side 25 of housing 20. Next, the resilient member 15 is inserted such that a proximal end 15*a* of the resilient member 15 is positioned within the conduit 16 formed between the legs 36, 36' of the bolt 30 and the distal end 15*b* of the resilient member 15 is positioned between the pair of walls 61, 61' forming the slot 62. The walls 61, 61' prevent the resilient member 15 from inadvertently displacing. After the bolt 30 and resilient member 15 are inserted into the housing 20, the cover 40 is mated together with the housing 20 such that the pegs 64, 64' are inserted and frictionally engaged with the sockets 63, 63', respectively whereby wedge 66 will partially seat within slot 62 between walls 61, 61' to prevent distal end 15*b* of resilient member 15 from kicking outwards when under pressure. When assembled, the bolt 30 may move between an open position (i.e., wherein a portion of the bolt 30 protrudes through the slotted opening 28 of the housing 20) as shown in FIG. 5 and a closed position (i.e., wherein the entire bolt 30 is essentially within the cavity 26 and no portion of the bolt 30 protrudes through the slotted opening 28 of the housing 20) as shown in FIG. 6.

To install the vent stop 10, the bottom side 24 is inserted first by positioning the spring leg 65 in an opening (not shown) formed in stile 54 such that the underside 86 (FIG. 6) of the flange 27 contacts the surface of the stile 54. The top side 25 of the housing 20 is then pushed, pivoting the top side 25 towards the stile 54 and forcing the spring leg 65 to compress until the recess 76 (FIG. 5) fits in the opening formed in the stile 54 and the underside 86 of the flange 27 is completely contacting the surface of the stile 54. When the vent stop is fully installed, the compressive forces in the spring leg 65 press the top side 25 of the housing 20 against the edge of the opening formed in the stile 54. Thus, the vent stop 10 is maintained within the opening in the stile 54 by compressive forces, without any fasteners, and is oriented along the longitudinal axis of the housing 20.

The vent stop 10 can be removed from the opening formed in the stile 54 by essentially reversing the process described above. First, the vent stop 10 will be pulled or pushed downwardly towards the bottom end 24 of the housing 20 so that the spring leg 65 compresses against the edge of the opening formed in the stile 54. Then, pivoting the top side 25 of the housing 20 until the edge of the opening formed in the stile 54 is clear of the ramped surface 75 of the top side 25 so that the top side 25 of the vent stop 10 can be pivoted away from the opening formed in the stile 54.

Apart from the ability to be removed from the sash 54 without damage, the vent stop 10 of the disclosure is also more forgiving with imperfectly formed openings in the stile 54 and variations in thickness of the sash material (i.e., vinyl or fiberglass). As noted above, the vent stop 10 of the disclosure is held in place by the compressive force of the spring leg 65 asserting forces against the edges of the opening in the stile 54, rather than by clamping or pinching the sash material between a spring leg 65 and the flange 27. Accordingly, the vent stop 10 of the disclosure will be held in place so long as the spring leg 65 is under some compression when the vent stop 10 is installed.

The illustrations and examples provided herein are for explanatory purposes and are not intended to limit the scope of the appended claims.

I claim:

1. A vent stop (10) comprising: a housing (20), a bolt (30), a resilient member (15), and a cover (40);

the housing (20) including a lateral side (21), a front side (22), a back side (23), a bottom side (24), and a top side (25) defining a cavity (26), the lateral side (21) includes a pair of walls (61, 61') that collectively form a slot (62), wherein the housing (20) further includes a peripheral flange (27) defining an opening (28) in the front side (22) of the housing (20), and a pair of opposingly oriented sockets (63, 63');

the bolt (30) including a front side (32), back side (33), two lateral sides (31, 31'), a bottom longitudinal side (34), and a top longitudinal side (35) defining a body (38), wherein at least one leg (36) depends from the back side (33) of the body (38), and wherein the at least one leg (36) includes a protuberance (37) and a tab projection (39);

the resilient member (15) defines a distal end (15*b*) and a proximal end (15*a*), wherein the proximal end (15*a*) of the resilient member (15) engages a conduit (16) formed in the back side (33) of the bolt (30) and a distal end (15*b*) of the resilient member (15) contacts the back side (23) of the housing (20) to urge the bolt (30) towards the opening (28) defined by the peripheral flange (27) of the housing (20); and the cover (40) including a lateral side (41) defining at least one channel (80), and a wedge (66) proximate a back side (43) of the cover (40), wherein the wedge (66) is configured to be positioned within the slot (62) formed by the pair of walls (61, 61') wherein the cover (40) further includes opposingly oriented pegs (64, 64') for insertion into the opposingly oriented sockets (63, 63') of the housing (20).

2. The vent stop (10) of claim 1, wherein the lateral side (21) of the housing (20) includes two channels (70, 70').

3. The vent stop (10) of claim 1, wherein the lateral side (41) of the cover (40) includes two channels (80, 80').

4. The vent stop (10) of claim 1, wherein the front side (32) of the bolt (30) defines a concave upper surface (12).

5. The vent stop (10) of claim 1, wherein the front side (32) of the bolt (30) includes a notch (13) formed at an edge of the front side (32) and the top longitudinal side (35).

6. The vent stop (10) of claim 1, wherein the resilient member (15) is a spring.

7. The vent stop (10) of claim 1, wherein the resilient member (15) urges the bolt (30) in a direction that is aligned with the opening (28) formed by the peripheral flange (27) of the housing (20).

8. The vent stop (10) of claim 1, wherein the lateral sides (21, 41) of the vent stop (10) are fully enclosed.

9. The vent stop (10) of claim 1, wherein the bottom side (24) of the housing (20) includes a spring leg (65).

* * * * *